United States Patent
Park

(10) Patent No.: US 10,181,920 B2
(45) Date of Patent: Jan. 15, 2019

(54) ETHERNET-BASED COMMUNICATION SYSTEM

(71) Applicant: SOLiD SYSTEMS, INC., Seongnam-si, Gyeonggi-do (KR)

(72) Inventor: Bum Soo Park, Seongnam-si (KR)

(73) Assignee: SOLiD, INC., Seongnam-si (KR)

( * ) Notice: Subject to any disclaimer, the term of this patent is extended or adjusted under 35 U.S.C. 154(b) by 0 days.

(21) Appl. No.: 15/321,997

(22) PCT Filed: Jun. 27, 2014

(86) PCT No.: PCT/KR2014/005775
§ 371 (c)(1),
(2) Date: Dec. 23, 2016

(87) PCT Pub. No.: WO2015/199267
PCT Pub. Date: Dec. 30, 2015

(65) Prior Publication Data
US 2017/0126344 A1 May 4, 2017

(30) Foreign Application Priority Data
Jun. 27, 2014 (KR) .................. 10-2014-0080213

(51) Int. Cl.
| H04J 3/06 | (2006.01) |
| H04J 14/08 | (2006.01) |
| H04L 7/04 | (2006.01) |
| H04L 7/033 | (2006.01) |

(52) U.S. Cl.
CPC ............ *H04J 3/0641* (2013.01); *H04J 14/08* (2013.01); *H04L 7/0331* (2013.01); *H04L 7/041* (2013.01)

(58) Field of Classification Search
CPC .... H04J 3/06; H04J 14/08; H04L 7/04; H04L 7/033
See application file for complete search history.

(56) References Cited

U.S. PATENT DOCUMENTS

| 5,668,814 | A | * | 9/1997 | Balatoni | ................... H04L 5/04 370/540 |
| 5,790,057 | A | * | 8/1998 | Linde | .................... H04L 1/0057 341/68 |
| 6,690,682 | B1 | * | 2/2004 | Giaretta | .................. H04J 3/047 341/141 |
| 7,050,468 | B2 | * | 5/2006 | Seto | ........................ H04J 3/247 370/503 |
| 7,295,554 | B1 | * | 11/2007 | Krishnamoorthy | ..... H04J 3/047 370/394 |

(Continued)

*Primary Examiner* — Mina Shalaby
(74) *Attorney, Agent, or Firm* — Sughrue Mion, PLLC

(57) ABSTRACT

An ethernet-based communication system is provided. The communication system comprises: a first unit configured to generate a reference clock signal by using an input first ethernet signal, multiplex the first ethernet signal and a second ethernet signal in response to the reference clock signal, and output the multiplexed ethernet signals; a second unit configured to generate the reference clock signal by using the multiplexed ethernet signals, separate the second ethernet signal from the multiplexed ethernet signals in response to the reference clock signal, and output the first ethernet signal; and a transmission medium for connecting the first and second units and transmitting the multiplexed ethernet signals from the first unit to the second unit.

8 Claims, 3 Drawing Sheets

(56) References Cited

U.S. PATENT DOCUMENTS

| | | | | |
|---|---|---|---|---|
| 7,308,006 | B1 * | 12/2007 | Banerjee | H04J 3/14 370/535 |
| 7,656,905 | B2 * | 2/2010 | Sheth | H04J 3/04 370/503 |
| 2003/0185251 | A1 * | 10/2003 | Ichino | H04J 3/047 370/535 |
| 2005/0036524 | A1 * | 2/2005 | Wojtowicz | H04J 3/04 370/537 |
| 2008/0130679 | A1 | 6/2008 | Natarajan et al. | |
| 2010/0040381 | A1 * | 2/2010 | Ohtani | H04B 10/2942 398/182 |
| 2010/0131830 | A1 * | 5/2010 | Brown | H03M 13/1515 714/776 |
| 2013/0287050 | A1 | 10/2013 | Wojtowicz | |

* cited by examiner

ETHERNET-BASED COMMUNICATION SYSTEM

CROSS REFERENCE TO RELATED APPLICATIONS

This application is a National Stage of International Application No. PCT/KR2014/005775, filed Jun. 27, 2014, and claims priority from Korean Patent Applications No. 10-2014-0080213 filed Jun. 27, 2014, the contents of which are incorporated herein by reference in their entireties.

BACKGROUND

1. Field

The inventive concept of the present invention relates to an ethernet-based communication system, and more particularly, to a communication system using a gigabit ethernet signal and a fast ethernet signal.

2. Description of Related Art

In response to the increase in user traffic and the demand for a high-speed communication network, gigabit ethernet-based communication systems that are standardized at a transmission rate in gigabits per second are widely used as well as fast ethernet-based communication systems that are standardized at a transmission rate in megabits per second.

However, in gigabit ethernet-based communication systems, fast ethernet is mainly used as a supervisory channel for managing the state of various devices constituting a system, unlike a main channel. Therefore, there is a problem that installation and operation costs are increased due to wavelength allocation dedicated for fast ethernet, addition of a physical line dedicated for fast ethernet, and addition of configurations for long-distance communication.

SUMMARY

The inventive concept of the present invention directs to provide an ethernet-based communication system capable of simultaneously transmitting gigabit ethernet signals and fast ethernet signals over one physical line without additional configuration.

According to an aspect of the inventive concept of the present invention, a communication system including: a first unit configured to generate a reference clock signal by using an input first ethernet signal, multiplex the first ethernet signal and a second ethernet signal in response to the reference clock signal, and output the multiplexed ethernet signals; a second unit configured to generate the reference clock signal by using the multiplexed ethernet signals, separate the second ethernet signal from the multiplexed ethernet signals in response to the reference clock signal, and output the first ethernet signal; and a transmission medium for connecting the first and second units and transmitting the multiplexed ethernet signals from the first unit to the second unit.

In example embodiments, the first ethernet signal may have a first transmission rate in gigabits per second, and the second ethernet signal may have a second transmission rate in megabits per second.

In example embodiments, the first unit may include: a first restorer configured to restore a clock signal using the first ethernet signal; a first serializer/deserializer configured to parallelize the first ethernet signal with first internal signals having the second transmission rate and output the result; a first phase lock loop configured to generate a reference clock signal by using the restored clock signal; a first coding part configured to perform coding process and output the first internal signals in response to the reference clock signal; and a second serializer/deserializer configured to serialize the first internal signals, which have been coding processed in response to the reference clock signal, and the second ethernet signal to have the first transmission rate, and configured to output the multiplexed ethernet signal.

In example embodiments, the first coding part may include: a first decoder configured to decode the first internal signals by 10B8B and output the decoded first internal signals; and a first encoder configured to encode the 10B8B decoded first internal signals by 8B9B and output the result.

In example embodiments, the second unit may include: a second restorer configured to restore a clock signal using the multiplexed ethernet signal; a third serializer/deserializer configured to parallelize the multiplexed ethernet signal with second internal signals having the second transmission rate and output the result; a second phase lock loop configured to generate a reference clock signal by using the restored clock signal; a divider configured to separate the second ethernet signal from the second internal signals in response to the reference clock signal and output a third internal signal; a second coding part configured to perform coding process on the third internal signals and output the third internal signals in response to the reference clock signal; and a fourth serializer/deserializer configured to serialize the coding processed third internal signals in response to the reference clock signal, to have the first transmission rate, and configured to output the first ethernet signal.

In example embodiments, the second coding part may include: a second decoder configured to decode the third internal signals by 9B8B; and a second encoder configured to encode the 9B8B decoded third internal signals by 8B10B.

In example embodiments, the first transmission rate may be 1.25 Gbps, and the second transmission rate may be 125 Mbps.

In example embodiments, the transmission medium may be an optical transmission medium.

An ethernet-based communication system according to the inventive concept of the present invention multiplexes a gigabit ethernet signal and a fast ethernet signal having different transmission rates between a transmitting terminal and a receiving terminal and transmits the gigabit ethernet signal and the fast ethernet signal through one physical line.

BRIEF DESCRIPTION OF THE FIGURES

Example embodiments of the present invention will be more clearly understood from the following detailed description taken in conjunction with the accompanying drawings in which.

DETAILED DESCRIPTION OF EXEMPLARY EMBODIMENTS

Figure 1:
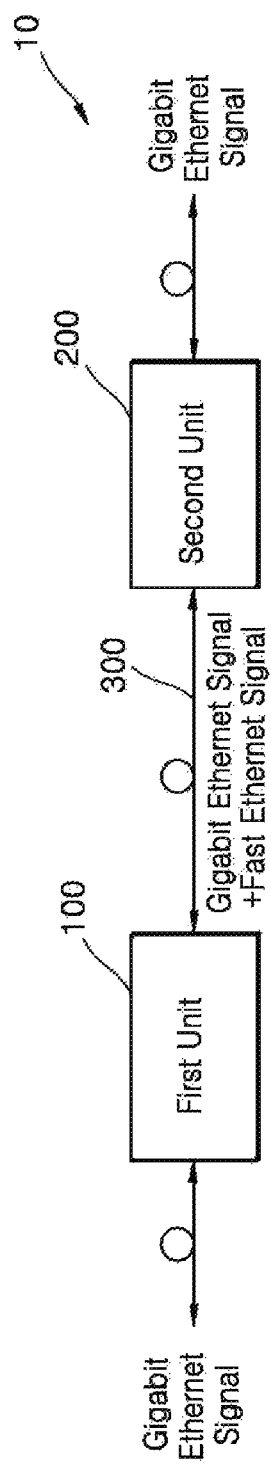
FIG. 1 is a view of a communication system according to an example embodiment of the present invention.

Since the present invention may have diverse modified embodiments, preferred embodiments are illustrated in the drawings and are described in the detailed description. However, this does not limit the present invention within specific embodiments and it should be understood that the present invention covers all the modifications, equivalents, and replacements within the idea and technical scope of the present invention.

In the description of the present invention, certain detailed explanations of the related art are omitted when it is deemed that they may unnecessarily obscure the essence of the present invention. In addition, numeral figures (for example, 1, 2, and the like) used during describing the specification are just identification symbols for distinguishing one element from another element.

Further, in the specification, if it is described that one component is "connected" or "accesses" the other component, it is understood that the one component may be directly connected to or may directly access the other component but unless explicitly described to the contrary, another component may be "connected" or "access" between the components.

In addition, terms such as " . . . unit", " . . . module", or the like refer to units that perform at least one function or operation, and the units may be implemented as hardware or software or as a combination of hardware and software.

Furthermore, components of the specification are divided in accordance with a main function of each component. That is, two or more components to be described below may be provided to be combined to one component or one component may be provided to be divided into two or more components for each more subdivided function. In addition, each of the respective components to be described below may additionally perform some or all functions among functions which other components take charge of in addition to a primary function which each component takes charge of and some functions among the primary functions which the respective components take charge of are exclusively charged by other components to be performed, of course.

Hereinafter, example embodiments of the present invention will be described in detail.

FIG. 1 is a view of a communication system 10 according to an example embodiment of the present invention. The communication system 10 may be applied between various types of equipment based on optical communication. For example, the communication system 10 may be applied between an optical line terminal (OLT) and an optical network unit (ONU) constituting an optical subscriber network or between two or more ONUs. Alternatively, the communication system 10 may be applied between a hub and a radio remote head in an optical communication-based base station system, and between a donor and a remote in an optical communication-based repeater system. FIG. 1 shows that the communication system 10 has a point-to-point network structure but the inventive concept is not limited thereto. It is to be understood that the communication system 10 may have various network structures such as a point-to-multipoint structure, a multipoint-to-multipoint structure, a ring structure, a bus structure, and a star structure.

Referring to FIG. 1, the communication system 10 may include a first unit 100, a second unit 200, and a transmission medium 300.

The first unit 100 may receive a first ethernet signal. The first ethernet signal may be a signal provided from an upper node or the like via a transmission medium such as an optical transmission medium, or may be a main signal for communication service. The first ethernet signal may have a first transmission rate in gigabits per second. The first transmission rate may be, e.g., 1.25 Gbps. Hereinafter, it will be described that the first transmission rate is, for example, 1.25 Gbps.

The first unit 100 may receive a second ethernet signal. The second ethernet signal may be, e.g., a signal for controlling the second unit 200 or monitoring the status of the second unit 200. The second ethernet signal may have a lower transmission rate than the first ethernet signal. The second ethernet signal may have, e.g., a second transmission rate in megabits per second. The second transmission rate may be, e.g., 125 Mbps. Hereinafter, it will be described that the second transmission rate is, for example, 125 Mbps.

The first unit 100 may generate a reference clock signal using the first ethernet signal and may multiplex the first and second ethernet signals in response to the reference clock signal. The first unit 100 may transmit the multiplexed ethernet signal to the second unit 200 through the transmission medium 300. This will be described in detail later below referring to FIG. 2.

The second unit 200 may generate the reference clock signal by using the multiplexed ethernet signals input through the transmission medium 300, may separate the second ethernet signal from the multiplexed ethernet signals in response to the reference clock signal, and may restore and output the first ethernet signal. This will be described in detail later below referring to FIG. 3.

The transmission medium 300 may connect the first unit 100 and the second unit 200 and may transmit the multiplexed ethernet signal from the first unit 100 to the second unit 200. The transmission medium 300 may include, for example, an optical transmission medium.

As such, in the communication system 10, the first and second ethernet signals having different transmission rates may be multiplexed without being transmitted from the first unit 100 to the second unit 200 via respective transmission mediums and may be transmitted from the first unit 100 to the second unit 200 through a single transmission medium 300.

Accordingly, the communication system 10 does not require additional cost for constructing and operating separate lines for each of the first and second ethernet signals, thereby reducing the cost of installing and operating the system.

Figure 2:
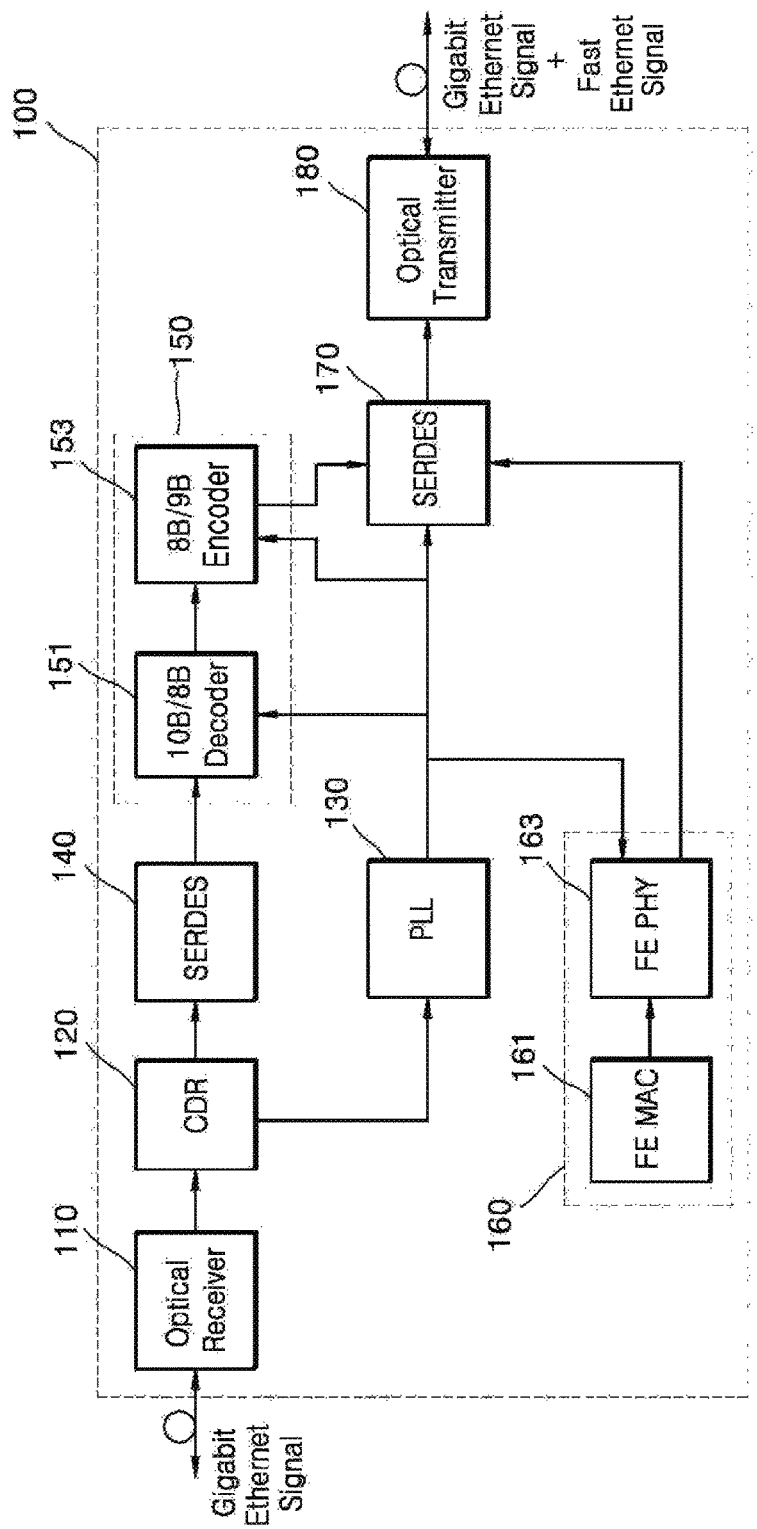
FIG. 2 is a schematic view of a partial configuration of a first unit according to an example embodiment of the present invention.

FIG. 2 is a schematic view of a partial configuration of the first unit 100 according to an example embodiment of the present invention. FIG. 2 is described with reference to FIG. 1 and repeated descriptions thereof are omitted for convenience of description.

Referring to FIGS. 1 and 2, the first unit 100 may include a first optical receiver 110, a first restorer (CDR) 120, a first phase lock loop (PLL) 130, a first serializer/deserializer (SERDES) 140, a first coding part 150, a second ethernet signal processor 160, a second SERDES 170, and a first optical transmitter 180.

The first optical receiver 110 may receive a first ethernet signal from an upper node or the like. Here, the first optical receiver 110 may be connected to the upper node or the like through an optical transmission medium, and may convert the first ethernet signal of an optical signal type transmitted through the optical transmission medium into an electrical signal and then transmit the electrical signal to the first restorer 120.

The first restorer 120 may restore a clock signal using the first ethernet signal. The first restorer 120 may transmit the restored clock signal to the first PLL 130 and may transmit the first ethernet signal to the first SERDES 140.

The first PLL 130 may generate a reference clock signal from the restored clock signal. The first PLL 130 may transmit the reference clock signal to the first coding part 150, the second ethernet signal processor 160, and the second SERDES 170.

The first SERDES 140 may parallelize the first ethernet signal with first internal signals having the same transmission rate as a second ethernet signal, that is, a second transmission rate and output the parallelized first ethernet signal. For example, the first SERDES 140 may parallelize a 1-bit first ethernet signal having a transmission rate of 1.25 Gbps with 10-bit first internal signals having a transmission rate of 125 Mbps and may output the parallelized 1-bit first ethernet signal.

The first coding part 150 may perform coding process on the first internal signal and output the first internal signals in response to the reference clock signal. Here, the response to the reference clock signal means that the first coding part 150 performs coding process and outputs the first internal signals in synchronization with the reference clock signal. Hereinafter, expressions of other configurations may also be considered to have the same meaning.

The first coding part 150 may include a first decoder 151 and a first encoder 153.

The first decoder 151 may decode the first internal signals by 10B8B in response to the reference clock signal and output the decoded first internal signals. For example, the first decoder 151 may decode 10-bit first internal signals having a transmission rate of 125 Mbps into 8-bit signals having a transmission rate of 125 Mbps and may output the signals.

Next, the first encoder 153 may encode first internal signals decoded with 8-bit signals having a transmission rate of 125 Mbps into 9-bit signals having a transmission rate of 125 Mbps in response to the reference clock signal and may output the signals.

Here, a 10B8B decoding process and a 8B9B encoding process refer to an coding process according to the IEEE 802.3 standard, and the first coding part 150 may include other decoders and/or encoders capable of performing the coding process according to the IEEE 802.3 standard.

The second ethernet signal processor 160 may include a medium access control (FE MAC) 161 and a physical layer (FE PHY) 163. The FE MAC 161 may generate the second ethernet signal having the second transmission rate and the FE PHY 163 may transmit the second ethernet signal to the second SERDES 170 in synchronization with the reference clock signal.

The second SERDES 170 serializes the first internal signals, which have been coding processed by the first coding part 150 in response to the reference clock signal, and the second ethernet signal to have the first transmission rate, and thus, may output a multiplexed ethernet signal.

For example, the second SERDES 170 may serialize first internal signals coding processed with 9-bit signals having a transmission rate of 125 Mbps and a 1-bit second ethernet signal having a transmission rate of 125 Mbps, and may generate a multiplexed ethernet signal having a transmission rate of 1.25 Gbps and output the multiplexed ethernet signal.

The first optical transmitter 180 may convert the multiplexed ethernet signal into an optical signal and may transmit the multiplexed ethernet signal converted into the optical signal to the second unit 200 through the transmission medium 300.

Figure 3:
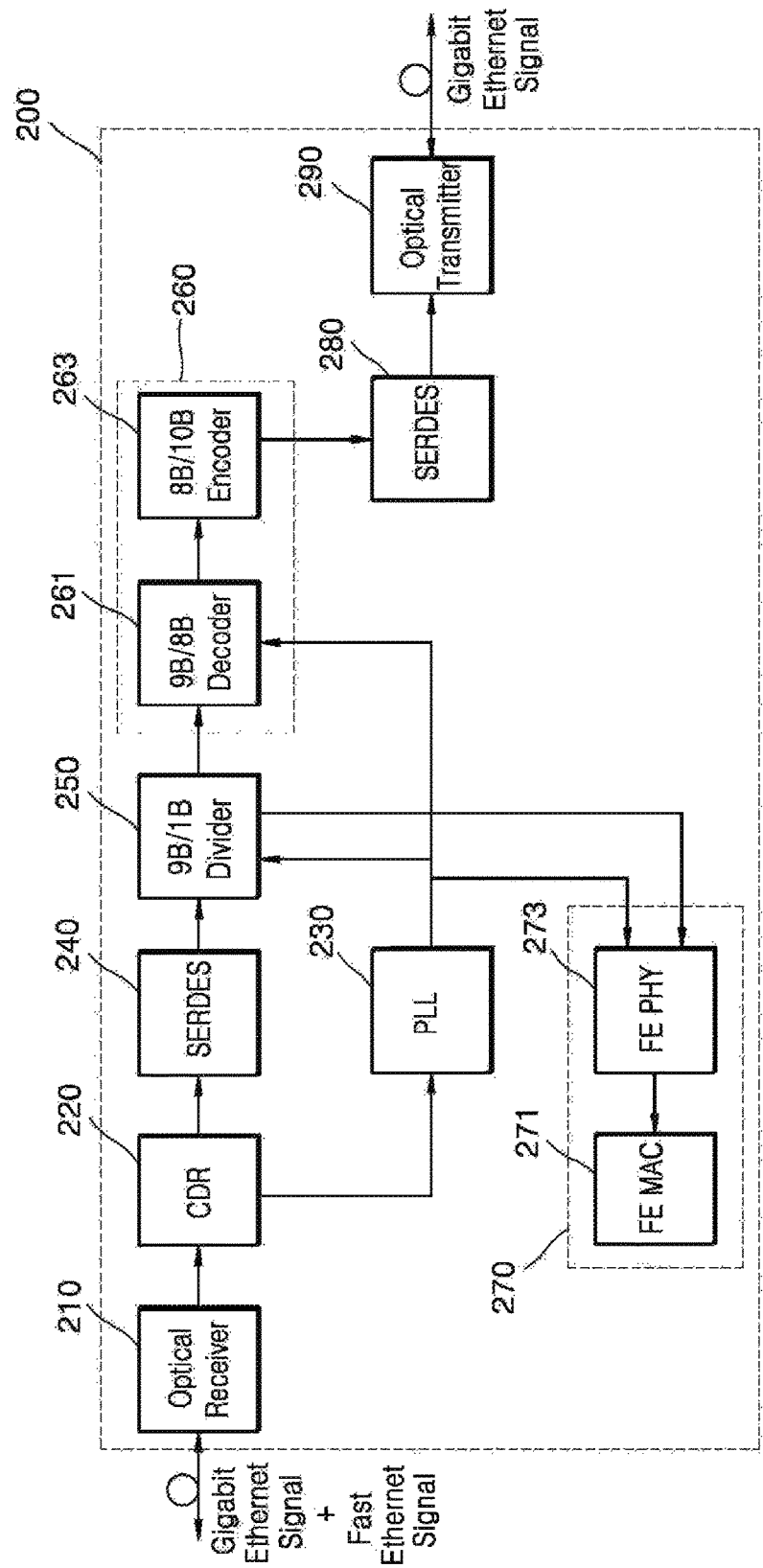
FIG. 3 is a schematic view of a partial configuration of a second unit according to an example embodiment of the present invention.

FIG. 3 is a schematic view of a partial configuration of the second unit 200 according to an example embodiment of the present invention. FIG. 3 is described with reference to FIG. 1 and repeated descriptions thereof are omitted for convenience of description.

Referring to FIGS. 1 and 3, the second unit 200 may include a second optical receiver 210, a second restorer (CDR) 220, a second phase lock loop (PLL) 230, a third serializer/deserializer (SERDES) 240, a divider 250, a second coding part 260, a second ethernet signal processor 270, a fourth SERDES 280, and a second optical transmitter 290.

The second optical receiver 210 may receive a multiplexed ethernet signal from the first unit 100. The second optical receiver 210 may convert the multiplexed ethernet signal of an optical signal type into an electrical signal, and then may transmit the electrical signal to the second restorer 220.

The first restorer 220 may restore a clock signal using the multiplexed ethernet signal. The first restorer 220 may transmit the restored clock signal to the second PLL 230 and may transmit the multiplexed ethernet signal to the third SERDES 240.

The second PLL 230 may generate a reference clock signal from the restored clock signal. The reference clock signal may correspond to a reference clock signal generated in the first PLL 130. The second PLL 230 may transmit the reference clock signal to the divider 250, the second coding part 260, and the second ethernet signal processor 270.

The third SERDES 240 may parallelize the multiplexed ethernet signal with second internal signals having the same transmission rate as a second ethernet signal, that is, a second transmission rate and may output the parallelized multiplexed ethernet signal. For example, the third SERDES 240 may parallelize a 1-bit multiplexed ethernet signal having a transmission rate of 1.25 Gbps with 10-bit second internal signals having a transmission rate of 125 Mbps and may output the parallelized 1-bit multiplexed ethernet signal.

The divider 250 may separate the second ethernet signal and the third internal signal from the second internal signals in response to the reference clock signal.

For example, the divider 250 may separate and output a 1-bit second ethernet signal having a transmission rate of 125 Mbps and 10-bit third internal signals having a transmission rate of 125 Mbps from second internal signals having a transmission rate of 125 Mbps.

The divider 250 may transmit the separated second ethernet signal to the second ethernet signal processor 270 and may transmit the third internal signals to the second coding part 260.

The second coding part 260 may perform coding process on the third internal signals in response to the reference clock signal and output the third internal signals. The second coding part 260 may include a second decoder 261 and a second encoder 263.

The second decoder 261 may decode the third internal signals by 9B8B in response to the reference clock signal and may output the result. For example, the third decoder 151 may decode 9-bit third internal signals having a transmission rate of 125 Mbps into 8-bit signals having a transmission rate of 125 Mbps and may output the signals.

Next, the second encoder 263 may encode the 9B8B decoded third internal signals by 8B10B and may output the result. For example, the encoder 263 may encode third internal signals decoded with 8-bit signals having a transmission rate of 125 Mbps into 10-bit signals having a transmission rate of 125 Mbps in response to the reference clock signal and may output the encoded signals.

Here, a 9B8B decoding process and a 8B10B encoding process refer to an coding process according to the IEEE 802.3 standard, and the second coding part 260 as well as the first coding part 150 may also include other decoders and/or encoders capable of performing the coding process according to the IEEE 802.3 standard.

The second ethernet signal processor 270 corresponds to the second ethernet signal processor 160 of the first unit 100. The second ethernet signal processor 270 may include a medium access control (FE MAC) 271 and a physical layer (FE PHY) 273. The physical layer 273 may transmit the second ethernet signal separated from the multiplexed ethernet signal to the FE MAC 271 in synchronization with the reference clock signal and the FE MAC 271 may perform a command or the like provided by the second ethernet signal processor 160 of the first unit 100 based on the second ethernet signal.

The fourth SERDES 280 may serialize and output third internal signals coding processed by the second coding part 260 in response to the reference clock signal to have the first transmission rate. In other words, the fourth SERDES 280 may restore the coding processed third internal signals into the first ethernet signal input to the first unit 100 and may output the third internal signals. For example, the fourth SERDES 280 may serialize third internal signals coding processed with 10-bit signals having a transmission rate of 125 Mbps to output a first ethernet signal having a transmission rate of 1.25 Gbps.

The second optical transmitter 290 may convert the first ethernet signal into an optical signal and may transmit the first ethernet signal to a subscriber or a lower node through a transmission medium such as an optical transmission medium or a UTP cable.

While the present invention has been particularly shown and described with reference to embodiments thereof, it will be understood that various changes in form and details may be made therein without departing from the spirit and scope of the following claims.

The invention claimed is:

1. A communication system comprising:
   a transmitting device comprising at least one processor configured to generate a reference clock signal by using a first ethernet signal which is input to the transmitting device and has a first transmission rate, multiplex the first ethernet signal and a second ethernet signal having a second transmission rate which is different from the first transmission rate in response to the reference clock signal, and output the multiplexed ethernet signal;
   a receiving device comprising at least one processor configured to generate the reference clock signal by using the multiplexed ethernet signal, separate the second ethernet signal from the multiplexed ethernet signal in response to the reference clock signal, and output the first ethernet signal; and
   a transmission cable for connecting the transmitting device and the receiving device and transmitting the multiplexed ethernet signal from the transmitting device to the receiving device,
   wherein a transmission rate of the multiplexed ethernet signal is substantially equal to the first transmission rate.

2. The communication system of claim 1, wherein
   the first transmission rate is a transmission rate in gigabits per second, and
   the second transmission rate is a transmission rate in megabits per second.

3. The communication system of claim 1, wherein the transmitting device comprises:
   a first restorer configured to restore a clock signal using the first ethernet signal;
   a first serializer/deserializer configured to parallelize the first ethernet signal with first internal signals having the second transmission rate and output a result;
   a first phase lock loop configured to generate a reference clock signal by using the restored clock signal;
   a first coding part configured to perform coding process on the first internal signals and output the first internal signals in response to the reference clock signal; and
   a second serializer/deserializer configured to serialize the first internal signals, which have been coding processed in response to the reference clock signal, and the second ethernet signal to have the first transmission rate, and configured to output the multiplexed ethernet signal.

4. The communication system of claim 3, wherein the first coding part comprises:
   a first decoder configured to decode the first internal signals by 10B8B and output the decoded first internal signals; and
   a first encoder configured to encode the 10B8B decoded first internal signals by 8B9B and output a result.

5. The communication system of claim 1, wherein the receiving device comprises:
   a second restorer configured to restore a clock signal using the multiplexed ethernet signal;
   a third serializer/deserializer configured to parallelize the multiplexed ethernet signal with second internal signals having the second transmission rate and output a result;
   a second phase lock loop configured to generate a reference clock signal by using the restored clock signal;
   a divider configured to separate the second ethernet signal from the second internal signals in response to the reference clock signal and output third internal signals;
   a second coding part configured to perform coding process on the third internal signals and output the third internal signals in response to the reference clock signal; and
   a fourth serializer/deserializer configured to serialize the coding processed third internal signals in response to the reference clock signal, to have the first transmission rate, and configured to output the first ethernet signal.

6. The communication system of claim 5, wherein the second coding part comprises:
   a second decoder configured to decode the third internal signals by 9B8B; and
   a second encoder configured to encode the 9B8B decoded third internal signals by 8B10B.

7. The communication system of claim 1, wherein
   the first transmission rate is 1.25 Gbps, and
   the second transmission rate is 125 Mbps.

8. The communication system of claim 1, wherein the transmission cable is an optical transmission cable.

* * * * *